United States Patent [19]
Saitoh et al.

[11] Patent Number: 5,952,258
[45] Date of Patent: *Sep. 14, 1999

[54] PROCESS FOR THE PREPARATION OF PYRIDINE USING ZEOLITE CATALYSTS

[75] Inventors: Morihito Saitoh; Yasutaka Tanaka, both of Hiroshima-ken, Japan

[73] Assignee: Daicel Chemical Industries, Ltd., Osaka-Fu, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/638,729

[22] Filed: Apr. 29, 1996

Related U.S. Application Data

[63] Continuation-in-part of application No. 08/481,082, Jun. 7, 1995, abandoned.

[30] Foreign Application Priority Data

May 24, 1995 [JP] Japan ..................... 7-149421
Sep. 25, 1995 [JP] Japan ..................... 7-270607

[51] Int. Cl.$^6$ .......................... B01J 29/04; C07D 213/08
[52] U.S. Cl. ................. 502/61; 502/73; 502/77; 502/181; 502/182; 502/201; 502/217; 502/227; 502/231; 502/242; 502/243; 502/263; 502/355; 546/250; 546/251; 546/254; 546/348
[58] Field of Search .................. 546/250, 251, 546/254, 348; 502/61, 73, 77, 181, 182, 201, 217, 227, 231, 242, 243, 263, 355

[56] References Cited

U.S. PATENT DOCUMENTS

| | | | |
|---|---|---|---|
| 3,702,886 | 11/1972 | Argauer et al. | 423/328 |
| 3,960,766 | 6/1976 | Beschke et al. | 252/437 |
| 4,332,943 | 6/1982 | Bicker et al. | 546/250 |
| 4,701,530 | 10/1987 | Swearingen et al. | 546/250 |
| 4,797,266 | 1/1989 | Evans | 423/328 |
| 4,810,794 | 3/1989 | Shimizu et al. | 546/250 |
| 4,861,894 | 8/1989 | Bowes et al. | 546/250 |
| 4,866,179 | 9/1989 | Cheng et al. | 546/250 |
| 5,013,843 | 5/1991 | Feitler et al. | 546/250 |
| 5,079,367 | 1/1992 | Hoelderich et al. | 546/250 |
| 5,081,247 | 1/1992 | Hoelderich et al. | 546/250 |
| 5,218,122 | 6/1993 | Goe et al. | 546/250 |
| 5,237,068 | 8/1993 | Shimizu et al. | 546/250 |
| 5,395,940 | 3/1995 | Angevine et al. | 546/250 |

*Primary Examiner*—Randy Gulakowski
*Attorney, Agent, or Firm*—Sughrue, Mion, Zinn, Macpeak & Seas, PLLC

[57] ABSTRACT

Disclosed is a process for the preparation of pyridine bases by a reaction of an aliphatic aldehyde and/or ketone with ammonia under gaseous phase using a specified catalyst in which a specified metal or combined metals are carried in or onto specified zeolites, for example, such as zeolites having a specified specific density range.

19 Claims, No Drawings

PROCESS FOR THE PREPARATION OF PYRIDINE USING ZEOLITE CATALYSTS

This is a Continuation-in-Part of application Ser. No. 08/481,082 filed Jun. 7, 1995 now abandoned.

FIELD OF THE INVENTION

The present invention relates to a process for the preparation of pyridine bases in which an aliphatic aldehyde and/or ketone and ammonia are allowed to react using a catalyst in which specified metals or combined metals are carried in or onto specified zeolites, for example, such as zeolites having specified specific density range.

BACKGROUND OF THE INVENTION

Generally, pyridine bases are a generic name of an alkyl-substituted pyridine including picolines and lutidines in addition to pyridine, which are important compounds as starting materials for preparing medicines or agricultural chemicals, solvents for reactions and, further solvents.

As processes for the preparation of the pyridine bases, there is a process in which an aliphatic aldehyde and ammonia are condensed under a gaseous phase, and it is publicly known that a crystalline aluminosilicate, so-called, zeolites are used as a catalyst in the process.

Furthermore, recently, it is also known that a zeolite manufactured by Mobil Oil Corporation [ZSM family typified by ZSM-5/disclosed in, for example, U.S. Pat. No. 3,702,886 (Japanese Patent Publication Kokoku No. 10064/1971)] is particularly preferred for the process.

The zeolite is characterized by a Si/Al atomic ratio of not less than 10 and a constraint index of 1–12.

Also, in U.S. Pat. No. 4,861,894 (Japanese Patent Unexamined Publication Kokai No. 9974/1988), there is disclosed a process for the preparation of pyridine bases in which a crystalline silicate such as the ZSM family is employed as a catalyst in combination with copper, zinc, bismuth, chromium, molibudenum, tungsten, cobalt, nickel, ruthenium, rhodium, paradium, and iridium as co-catalytic metals.

However, the reaction yields are industrially less than satisfactory in spite of using the above-mentioned catalysts.

Specifically, Examples of the above-described U.S. Pat. No. 4,861,894 describe that the pyridine bases are synthesized using acetaldehyde and formaldehyde as starting materials to obtain pyridine yield of 47% and picoline yield of 17% (total yield of 61%). Furthermore, Japanese Patent Publication Kokoku No. 92368/1994 [Japanese Patent Publication Kokai No. 181256/1987] and Japanese Patent Publication Kokoku No. 92369/1994 [Japanese Patent Publication Kokai No. 139168/1988] describe processes in which there are employed zeolites in or on to which Tl, Co, and Pb compounds are carried.

However, the metals, particularly Tl and Pb are extremely toxic, and are highly dangerous from the viewpoint of environmental and human safety.

As a result of an intensive study in view of the above described situations, the present inventor has found that pyridine bases can be obtained with a surprisingly high yield by using a catalyst in which specified metal compounds or ions are carried in or on to zeolites by modifying, specifically, by doping, by mixing, or by ion-exchanging.

SUMMARY OF THE INVENTION

A first aspect of the present invention relates to a process for the preparation of pyridine bases characterized in that in a process for the preparation of pyridine bases by the condensation of aliphatic aldehydes and/or ketones with ammonia in the presence of catalysts under a gaseous phase, the improvement which comprises using a catalyst in which there are carried at least one metal compounds or metal ions selected from the group consisting of indium, silver, germanium, and gallium in or on to zeolites having Si/Al atomic ratio of at least 10 and a constraint index of 1–12, by modifying such as by doping, by mixing, or by ion-exchanging.

A second aspect of the present invention relates to a process for the preparation of pyridine bases by the condensation of aliphatic aldehydes and/or ketones with ammonia in the presence of catalysts under a gas phase, the improvement which comprises using a zeolite having a density of 0.5 to 1.0 g/ml after pelletized, as a catalyst.

A third aspect of the present invention relates to a process for the preparation of pyridine bases by the condensation of aliphatic aldehydes and/or ketones with ammonia in the presence of catalysts under a gas phase, the improvement which comprises using a catalyst in which a mixture composed of indium and tungsten or indium and molybdenum is carried in or on a zeolite by doping, by mixing, or by ion-exchanging.

A fourth aspect of the present invention relates to a metal-contained zeolite having a Constraint Index range of 1–12 in which there is carried a mixture composed of indium and tungsten or indium and molybdenum.

According to the aspects of the present invention, the pyridine bases can be obtained by the reaction of aliphatic aldehydes and/or ketones with ammonia in the presence of catalysts under a gaseous phase, using a catalyst in which there are carried specified metal compounds or metal ions in or on to specified zeolites by modifying such as by doping, by mixing, or by ion-exchanging, which is safe in industrial uses.

DETAILED DESCRIPTION OF THE INVENTION

In the following, the present invention will be described in detail.

According to a first aspect of the present invention, there is provided a process for the preparation of pyridine bases characterized in that in a process for the preparation of pyridine bases by the condensation of aliphatic aldehydes and/or ketones with ammonia in the presence of catalysts under a gaseous phase, the improvement which comprises using a catalyst in which there are carried at least one metal compounds or metal ions selected from the group consisting of indium, silver, germanium, and gallium in or on to zeolites having Si/Al atomic ratio of at least 10 and a constraint index of 1–12, by doping, by mixing, or by ion-exchanging.

According to a second aspect of the present invention, there is provided a process for the preparation of pyridine bases by the condensation of aliphatic aldehydes and/or ketones with ammonia in the presence of catalysts under a gas phase, the improvement which comprises using a zeolite having a density of 0.5 to 1.0 g/ml after pelletized, as a catalyst.

According to a third aspect of the present invention, there is provided a process for the preparation of pyridine bases by the condensation of aliphatic aldehydes and/or ketones with ammonia in the presence of catalysts under a gas phase, the improvement which comprises using a catalyst in which a mixture composed of indium and tungsten or indium and molybdenum is carried in or on a zeolite by doping, by mixing, or by ion-exchanging.

According to a fourth aspect of the present invention, there is provided a metal-contained zeolite having a Constraint Index range of 1–12 in which there is carried a mixture composed of indium and tungsten or indium and molybdenum.

As the aliphatic aldehydes to be employed in the present invention, there are exemplified aliphatic aldehydes such as formaldehyde, acetaldehyde, propionaldehyde, acrolein, methacrole-in, croton aldehyde which have a carbon number ranging from 1 to 5. Those may be solely employed and more than two kinds may be combined.

Furthermore, the above-described aliphatic aldehydes may be combined with aliphatic ketones. For example, as a particularly preferred combination in the aliphatic aldehydes in order to prepare pyridine or beta-picoline, a combination of acrolein with acetaldehyde and a combination of acetaldehyde with formaldehyde are preferred.

In the case of the combination of acrolein with acetaldehyde, the molar ratio of acrolein: acetaldehyde: ammonia preferably ranges in a scope of 1:(2–0.2):(0.5–5). In the case of the combination of acetaldehyde with formaldehyde, the molar ratio of acetaldehyde:formaldehyde:ammonia preferably ranges in a scope of 1:(0.3–3): (0.5–5).

Zeolites to be employed in the present invention have a Si/Al atomic ratio of at least 10, preferably at least 12, and more preferably at least 15. Furthermore, these zeolites should have a constraint index within a scope of 1–12, preferably 5–9, and more preferably 5.5–8.5 from the viewpoint of obtaining a sufficient effect for carrying metals.

As a particularly preferred zeolite, there are exemplified crystalline silicates having an atomic ratio of Si to Al, B, Fe, and/or Ga of at least 12, and a constraint index of 1–12. It is to be noted that the constraint index is an index for representing a microporous structure in zeolites, and a specific method for determining is described in the above-described U.S. Pat. No. 4,016,218, etc.

That is, prior to testing, a zeolite is treated with a stream of air at 1000° F. for at least 15 minutes, and then it is flushed with helium and the temperature adjusted between 550° C. and 950° C. to give an isomerization ratio of a hydrocarbon between 10% and 60%. Successively, the mixture of two hydrocarbons described hereinafter is passed at 1 liquid hourly spaced velocity (1 volume of liquid per volume of catalyst per hour) over the catalyst with a helium dilution to give a helium to two kinds of hydrocarbons mole ratio of 4:1. After 20 minutes, a sample of the effluent is taken and analyzed, most conveniently by gas chromatography, to determine the fraction remaining unchanged for each of the two kinds of hydrocarbons. The constraint index is calculated as follows:

Constraint Index=log(fraction of n-hexane remaining)/log(fraction of 3-methylpentene remaining).

Table-1 shows Constraint Index values for typical zeolites.

Of those, as zeolites having particularly preferred characteristics, there is exemplified ZSM family disclosed in the above-described U.S. Pat. No. 3,702,886, which is most popular, and further can be readily obtained.

Of the ZSM family in the above-described U.S. Pat. No. 3,702,886, a typical ZSM-5 has the structure as described below:

$0.9 \pm 0.2 M_{2/n}O:Al_2O_3:ySiO_2:zH_2O$

[in the above equation, M is at least one of cations having n-functionalities, y is at least 5, and z is 0–40].

TABLE 1

Constraint Index for typical zeolites

| Zeolite | Constraint Index |
| --- | --- |
| ZSM-5 | 6–8.3 |
| ZSM-11 | 5–8.7 |
| ZSM-12 | 2.3 |
| ZSM-23 | 9.1 |
| ZSM-35 | 4.5 |
| Mordenite | 0.5 |
| Aluminum-removed Y | 0.5 |
| Zeolite Beta | 0.6–2.0 |

Furthermore, as a preferred zeolite, there are exemplified crystalline silicates having a density of 0.5 to 1.0 g/ml, preferably from 0.6 to 0.9 g/ml.

In the case when the density of the zeolite is below 0.5 g/ml, a mechanical strength of the zeolite unpreferably decreases and, contrarily, in the case when the density of the zeolite exceeds 1.0 g/ml, a yield in a reaction unpreferably decreases.

The zeolite in the present invention can be prepared by a method in which powdered zeolite is mixed with a binder such as alumina, silica, and diatomite, etc., followed by forming in the form of column-shaped or cylinder-shaped pellets with a pelletizer. In the method for preparing the zeolite with powdered zeolite and binders, the density of zeolite molded can be adjusted by controlling pressures in pelletizing.

Furthermore, water or a polyvinylalcohol aqueous solution can be optionally mixed into a mixture of zeolite with the above-described binder, and then pellets are molded with a pelletizer.

Still further, in the case when spheres are molded with a rotating drum, density of zeolite after molding can be controlled by adjusting rotational velocity and/or rotational time of period. The density of zeolite in the present invention is not so-called apparent bulk specific gravity (corresponding to the total weight of pellets or spheres divided by volume occupied by whole pellets or spheres in the case when the pellets or spheres are filled up in a reaction vessel, etc.) in a molded solid catalyst, and it is a value which is the weight of one particle in the pellets divided by geometrical volume of the particle.

A method for measuring is based on JIS Z8807 (Method for measuring by volume in a method No. 6. for measuring specific gravity of a solid).

The density of pellet-shaped or spherical zeolite ranges from 0.5 to 1.0 g/ml, and preferably from 0.6 to 0.9 g/ml. In the case when the density is below 0.5 g/ml, mechanical strength decreases, unpreferably resulting in that pellets or spheres are readily powdered in filling up or during a reaction in industrial uses.

Contrarily, in the case when the density exceeds 1.0 g/ml, a reaction yield unpreferably lowers.

The zeolites are generally synthesized as alkali ion types having sodium ion, ammonium ion, etc. as a component of cations.

The starting zeolites for preparing catalysts to be employed in the present invention are preferably a proton type in which the above-described alkali ions such as sodium, etc. are ion-exchanged with a proton using a conventional method.

In the catalysts to be employed in the present invention, there are carried at least one metal compounds or metal ions selected from the group consisting of indium, silver, germanium, and gallium in or on to the above-described zeolites by modifying, specifically, by doping, by mixing, or by ion-exchanging. Of those, there is preferred a catalyst in which indium is carried.

As the metal compounds employed in the case, there are exemplified oxides, chlorides, nitrates, halides, sulphates, phosphates, hydroxides, sulphides, silicates, titanates, carbonates, organic carboxylates, organic chelates, organic metal compounds, or acetates. At least one of the compounds can be employed.

The starting zeolites are usually calcined after being modified with the above-described metals. Although calcination is conducted at 300–850° C. for several hours in air atmosphere or nitrogen atmosphere. The calcination of the catalyst is not always necessary because the catalysts are heated in a tubular reactor in the process for the preparation of the pyridine bases of the present invention.

As the above-described methods for modifying, specifically, for doping or for mixing, there are specifically exemplified an impregnation method [an equilibrium adsorption method, a pore-filling method, an incipient wetness method, a method by evaporation to dryness, a spraying method, a sedimentation method (a kneading method, a precipitation method), and an ion-exchange method] which are described in, for example, the literature "Shokubai Koza <5 Catalyst Design> Catalyst Society/Kodansha".

Of those, an effect in the present invention can be obtained by a method in which a molded zeolite or powdered zeolite is immersed in an aqueous solution of chlorides, nitrates, hydroxides, oxides, and sulphates which contain at least one selected from indium, silver, germanium, and gallium by the equilibrium adsorption method which is one of impregnation methods to adsorb, and then filtered after adsorbing and calcined. The incipient wetness method, pore-filling method, method by evaporation to dryness, and spraying method which are described in the literature <5 Catalyst Design>.

Otherwise, there may be applied a process that at least one metal compounds selected from the group consisting of indium compounds, silver compounds, germanium compounds, and gallium compounds are mixed or kneaded together with the powdered zeolites in the form of powder or a mixture with a binder such as water, etc., by the kneading method which is one of sedimentation methods, followed by calcination.

Otherwise, there may also be applied a process that hydroxides which are obtained by neutralization of at least one of nitrates or acetates selected from the group consisting of indium, silver, germanium, and gallium with an aqueous ammonia, etc., are mixed or kneaded together with the powdered zeolites in the form of powder by the kneading method, followed by calcination.

Furthermore, there may also be applied a precipitation method that the powdered zeolites are dispersed in an aqueous solution of at least one of nitrates or acetates selected from the group consisting of indium, silver, germanium, and gallium, followed by adding an aqueous ammonia, etc. into the solution to precipitate metal hydroxides onto the surface of zeolites, and followed by being washed with water and calcined.

In addition, the above-described starting zeolites having a constraint index of 1–12 which include an alkali ion type, an ammonium type, or a proton type may be modified to indium-, silver-, germanium-, or gallium-type by an ion-exchanging method in which the zeolites are immersed in an aqueous solution having a concentration of 0.001–15 g/liter of chlorides, nitrates, sulfides, and hydroxides containing indium, silver, germanium, or gallium at a fixed temperature for a fixed period of time while stirring, followed by repeating ion-exchanging and filtering, and finally washing with water.

Although a preferred range is different depending upon the starting zeolites or metal compounds to be employed, the content of copper compounds, indium compounds, bismuth compounds, silver compounds, germanium compounds, and gallium compounds which are introduced into the zeolites by modifying, specifically, by doping, by mixing, and or by ion-exchanging as described hereinabove ranges from approximately 0.001 to 15% by weight, preferably from 0.01 to 10, and more preferably from 0.2 to 5.

In the case of not more than 0.001% by weight, a modification by the introduced metal cannot be sufficiently attained, unpreferably resulting in becoming low in effects and, contrarily, in the case of exceeding 15% by weight, nor only becoming economically disadvantageous but also an increase in yield does not unpreferably proportionate to the introduced amounts.

The zeolites are usually in the form of fine powder, in which there are introduced at least one metal compounds or metal ions selected from the group consisting of indium, silver, germanium, and gallium in or on to zeolites by modifying, specifically, by doping, by mixing, and or by ion-exchanging with a kneading method, an impregnation method, an immersion method, a precipitation method, a method by evaporation to dryness, an ion-exchange method, and an equilibrium adsorption method. However, it is difficult to employ the powder-shaped zeolites as a catalyst in a fixed-bed reactor under a gas phase which is generally employed in industrial operations.

Accordingly, the powder is preferably molded into the shape of a pellet having an appropriate particle size by methods such as pelletizing, extruding, and rotating, etc. after mixing with an appropriate binder. Even though the starting zeolites have been already molded into a shape for industrial use, metals can be introduced to prepare the catalyst for employing in the present invention without any detrimental effects.

Thus, zeolites which either are already molded for industrial use, or already contain, by the above-described methods, indium, silver, germanium, or gallium, can be further modified by doping, by mixing, and or by ion-exchanging with either one of or any combination of compounds of indium, silver, germanium, and/or gallium by a kneading method, an impregnation method, an immersion method, a precipitation method, a method by evaporation to dryness, an ion-exchange method, an equilibrium adsorption method, and pore-filling method. Also in this case, zeolites are usually calcined after the final modification such as doping, mixing, and or ion-exchange.

Of the above-described metal components to be introduced into zeolites, indium is preferably introduced in combination with tungsten or molybdenum, resulting in that yield of piridines is further improved compared to introduction of indium alone.

Weight ratio of tungsten or molybdenum to indium to be introduced into zeolites ranges from 0.001 to 1000, preferably from 0.1 to 10. In the case when the weight ratio is out of the range, a synergistic effect is not obtained in the improvement of yield. Tungsten or molybdenum to be introduced together with indium can be also employed in the form of a chloride, a nitrate, an acetate, a hydroxide, an oxide, a sulphate, and an alkali salt such as ammonium salt of tungstic acid or molybdic acid.

There is not limited the order in the case of introducing indium and tungsten or molybdenum into zeolites, and further indium and tungsten or molybdenum may be simultaneously introduced with a mixed solution thereof.

Furthermore, the powdered compounds of tungsten or molybdenum may be simultaneously mixed or kneaded with powdered zeolites by a kneading method which is one of precipitation methods in the Presence or absence of a binder such as water, followed by being calcined.

Although calcination is conducted at 300–850° C. for several hours in air atmosphere or nitrogen atmosphere, the above-described calcination of catalysts is not always necessary, because in the process for the preparation of the pyridine bases of the present invention, the catalysts are heated in a tubular reactor, as described hereinabove.

Si/Al atomic ratio is adjusted by a method disclosed in the above-described U.S. Pat. No. 3,702,886 or by Yashima method [Catalyst 23(3), 232 (1981)], i.e. by controlling the ratio between $SiO_2$, sodium silicate and sodium aluminate, or aluminum sulfate which are starting materials when zeolites are hydrothermally synthesized.

In order to prepare the pyridine bases from aliphatic aldehydes and/or ketones and ammonia according to the present invention, a fixed-bed reactor under a gas phase is usually employed, as described hereinabove. Aliphatic aldehydes, ketones, or a mixture thereof are employed in a molar ratio of approximately 0.5 to 2 or so to ammonia under a gaseous state, which are starting materials.

There is employed a spaced velocity (GHSV) of 100–10000, and preferably 200–3000. Reaction temperature ranges from 300 to 600° C. preferably from 400 to 550° C. Pressure or gases in the reaction ranges from less than atmospheric pressure to a pressurized condition of several atmospheres, and preferably in the vicinity of atmospheric pressure from the viewpoint of economy of equipment construction.

In the following, although the present invention is specifically illustrated by Examples and Comparative Examples, the present invention is not limited by those.

It is to be noted that the calculation method of reaction results in the Examples depends upon the following equations based on the total carbon atoms in starting aliphatic aldehydes and ketones.

Pyridine yield (%)=(total C atoms in produced pyridine)×100/(total carbon atoms in starting aldehydes and or ketones)

Picoline yield (%)=(total C atoms in produced picoline)×100/(total carbon atoms in starting aldehydes and or ketones)

COMPARATIVE EXAMPLE 1

ZSM-5 was prepared as described below according to a method disclosed in U.S. Pat. No. 3,702,886. That is, 22.9 grams of $SiO_2$ was partially dissolved in 100 ml. 2.18N tetrapropyl ammonium hydroxide by heating to temperature of 100° C. There was then added a mixture of 3.19 grams of sodium aluminate (a composition containing 42% by weight of $Al_2O_3$, 30.9% by weight of $Na_2$, and 27.1% by weight of $H_2O$) dissolved in 53.8 ml of water to obtain a mixture. The mixture was maintained in an autoclave equipped with a glass cylinder at 150° C. for six days.

A solid obtained was filtered and washed with water, and then dried at 110° C., followed by being calcined at 530° C. for 4 hours to obtain a white crystalline. As a result of analyses, Si/Al atomic ratio in the crystalline was 60, and X-ray diffraction pattern was consistent with those described in U.S. Pat. No. 3,702,886. The crystalline showed the constraint index of 6.9. The ZSM-5 was ion-exchanged with an aqueous solution containing 5% of ammonium chloride at 50–60° C., followed by being calcined at 500° C. to obtain an HZSM-5. The HZSM-5 was molded by an extruder after kneaded together with alpha-alumina hydrate and water, Followed by being formed into a sphere with a rotating drum.

Starting materials were mixed in the acrolein:acetaldehyde:ammonia composition of 1:0.5:2, and then a reaction was carried out at the reaction temperature of 450° C. and at the GHSV of 500 for 6 hours using the above-described catalyst. A crude reaction solution was gas chromatographically analyzed to identify a respective yield of pyridine 40%, beta-picoline 26%, and alpha-picoline 1% (total yield of 67%).

EXAMPLE 1

Same procedures as described in Comparative Example 1 were repeated except that HZSM-5 (40 g) obtained was immersed in an aqueous solution containing 10% of silver nitrate and was treated at 80° C. for 2 hours, followed by being filtered and washed with 500 g of water (a process water). It was dried at 120° C. in atmospheric air, and was molded by an extruder after kneaded together with alpha-alumina hydrate and water, followed by being formed into a sphere with a rotating drum.

After formed, it was calcined at 550° C. for 2 hours.

Thus, HZSM-5/Ag (Ag content of 3% by weight analyzed by an atomic absorption spectroscopy) was prepared. The above-described catalyst was tested according to Comparative Example 1 to obtain a respective yield of pyridine 45%, beta-picoline 26%, and alpha-picoline 1% (total yield of 73%).

EXAMPLE 2

Same procedures were repeated except that the aqueous solution of silver nitrate employed in Example 1 was replaced with an aqueous solution of indium nitrate to obtain HZSM-5/In (indium content of 4.0% by weight analyzed by an atomic absorption spectroscopy). The above-described catalyst was tested according to Example 1 to obtain a respective yield of pyridine 50%, beta-picoline 27%, and alpha-picoline 1% (total yield of 78%).

EXAMPLE 3

Same procedures were repeated except that the aqueous solution of silver nitrate employed in Example 1 was replaced with an aqueous solution of gallium nitrate to obtain HZSM-5/Ga (Ga content of 3.5% by weight analyzed by an atomic absorption spectroscopy). The above-described catalyst was tested according to Example 1 to obtain a respective yield of pyridine 47%, beta-picoline 26%, and alpha-picoline 1% (total yield of 74%).

EXAMPLE 4

Same procedures were repeated except that the aqueous solution of silver nitrate employed in Example 1 was replaced with an aqueous solution of germanium nitrate to obtain HZSM-5/Ge (Ge content of 3.5% by weight analyzed by an atomic absorption spectroscopy). The above-described catalyst was tested according to Example 1 to obtain a respective yield of pyridine 47%, beta-picoline 26%, and alpha-picoline 1% (total yield of 74%).

It is to be noted that HZSM-5s having the same Si/Al atomic ratio and constraint index as in Comparative Example 1 were employed in the above-described Examples 1–6.

COMPARATIVE EXAMPLE 2

Same procedures were repeated except that silver nitrate employed in Example 1 was replaced with copper nitrate to obtain HZSM-5/Cu (Cu content of 3.5% by weight analyzed by an atomic absorption spectroscopy). The above-described catalyst was tested according to Example 1 to obtain a respective yield of pyridine 42%, beta-picoline 26%, and alpha-picoline 1% (total yield of 69%).

COMPARATIVE EXAMPLE 3

Same procedures were repeated except that silver nitrate employed in Example 1 was replaced with bismuth nitrate to obtain HZSM-5/Bi (Bi content of 5.0% by weight analyzed by an atomic absorption spectroscopy). The above-described catalyst was tested according to Example 1 to obtain a respective yield of pyridine 43%, beta-picoline 26%, and alpha-picoline 1% (total yield of 70%).

COMPARATIVE EXAMPLE 4

Same procedures were repeated according to Comparative Example 1 except that an already molded faujasite Y type zeolite (Si/Al atomic ratio of 2.3 and the constraint index of 0.4) which is commercially supplied was employed to obtain a respective yield of pyridine 25%, beta-picoline 27%, and alpha-picoline 1% (total yield of 53%).

COMPARATIVE EXAMPLE 5

Same procedures were repeated according to Comparative Example 1 except that an already molded USY type zeolite (Si/Al atomic ratio of 160 and the constraint index of 0.5) which is commercially supplied was employed to obtain a respective yield of pyridine 25%, beta-picoline 30%, and alpha-picoline 1% (total yield of 56%).

COMPARATIVE EXAMPLE 6

Same procedures as described in Example 1 were repeated except that HZSM-5 in Example 1 was replaced with USY type zeolite (Ag content of 3% by weight analyzed by an atomic absorption spectroscopy) in Comparative Example 5. Same test was conducted according to Comparative Example 1 to obtain a respective yield of pyridine 26%, beta-picoline 30%, and alpha-picoline 1% (total yield of 57%).

EXAMPLE 5

Dependence of Piridine Yield and Mechanical Strength of Catalyst Upon the Difference of Catalyst Density After the HZSM-5 was molded by the same procedures as in Comparative Example 1, it was calcined at 530° C. to obtain a catalyst having density of 0.78 g/ml composed of 75 wt % of HZSM-5 and 25 wt % of an alumina binder.

Starting materials were mixed in the acrolein:acetaldehyde:ammonia composition of 1:0.5:2, and then a reaction was carried out at the reaction temperature of 450° C. and at the GHSV of 500 for 6 hours using the above-described catalyst. A crude reaction solution was gas chromatographically analyzed to identify a respective yield of pyridine 42%, beta-picoline 26%, and alpha-picoline 1% (total yield of 69%). It is to be noted that a powered ratio of the catalyst was 0.62%.

Measurement of the powdered ratio was conducted and calculated as follows. 200 g of the catalyst was dropped through a pipe made by stainless steel having the internal diameter of 2.8 mm and the length of 3 m which is vertically placed over 15 seconds (13.3 g/second) onto a metal plate, followed by being passed through a sieve having 10 meshes. Residual catalyst on the sieve was weighed.

Powdered ratio=[200(g)−residual amount (g) of the catalyst on the sieve]×100/200(g)

EXAMPLES 6–9

Dependence of Piridine Yield and Mechanical Strength of Catalyst Upon the Difference of Catalyst Density HZSM-5 was molded by the same procedures as in Example 5, except that the rotating drum was operated by changing velocity than in Example 5 to obtain catalysts having respective densities.

Piridines were prepared by the same conditions as in Example 5. A crude reaction solution was gas chromatographically analyzed to identify a respective yield of pyridine, beta-picoline, and alpha-picoline.

COMPARATIVE EXAMPLE 7

Dependence of Piridine Yield and Mechanical Strength of Catalyst Upon the Difference of Catalyst Density HZSM-5 was molded by the same procedures as in Example 5, except that the rotating drum was operated with a higher velocity than in Example 5 to obtain a catalyst having density of 1.10 g/ml. Piridines were prepared by the same conditions as in Example 5. A crude reaction solution was gas chromatographically analyzed to identify a respective yield of pyridine 33%, beta-picoline 22%, and alpha-picoline 2% (total yield of 58%).

COMPARATIVE EXAMPLES 8 AND 9

Dependence of Piridine Yield and Mechanical Strength of Catalyst Upon the Difference of Catalyst Density HZSM-5 was molded by the same procedures as in Example 5, except the rotating drum was operated by changing velocity the in example 5 to obtain catalysts having respective densities.

Piridines were prepared by the same conditions as in Example 5. A reaction solution was gas chromatographically analyzed to identify a respective yield of pyridine, beta-picoline, and alpha-picoline.

In table 2, there are shown respective densities of the catalysts in Examples 5–9 and Comparative Examples 7–9, yield, and powdered ratio, respectively.

TABLE 2

|  |  | D | P | BP | AP | PR |
|---|---|---|---|---|---|---|
| Example | 5 | 0.78 | 42 | 26 | 1 | 0.62 |
|  | 6 | 0.61 | 43 | 26 | 1 | 0.81 |
|  | 7 | 0.56 | 43 | 26 | 1 | 1.71 |
|  | 8 | 0.89 | 41 | 26 | 1 | 0.55 |
|  | 9 | 0.96 | 38 | 25 | 1 | 0.35 |
| Comparative Example | 7 | 1.10 | 33 | 22 | 2 | 0.32 |
|  | 8 | 1.38 | 30 | 21 | 1 | 0.20 |
|  | 9 | 0.48 | 44 | 26 | 1 | 4.02 |

In table 2, respective abbreviations are as follows.
D: Density of catalyst
P: Piridine (%)
BP: Beta-picolin (%)

AP: Alpha-picolin (%)
PR: Powdered ratio (%)

EXAMPLE 10

Effect by the Combination of Indium with Tungsten

Same procedures as described in Comparative Example 1 were repeated except What HZSM-5 (40 g) obtained was immersed in an aqueous solution containing 10% of silver indium and was treated at 80° C. for 2 hours, followed by being filtered and washed with 500 g of water (a process water). It was dried at 120° C. in atmospheric air, followed by immersing into an aqueous solution containing 5% of tungsten ammonium. Successively, it was thermally treated at 80° C. for 2 hours, and then filtered, followed by being washed with 500 g of water (a process water).

Successively, it was dried at 120° C. in atmospheric air, and then it was molded by an extruder after kneaded together with alpha-alumina hydrate and water, and sphere-shaped catalysts were formed with the rotating drum.

After formed, it was calcined at 550° C. for 2 hours.

Thus, HZSM-5/Ag (having In content of 4.0% by weight and tungsten content of 1.0% analyzed by an atomic absorption spectroscopy) was prepared. Thus-prepared catalyst was tested according to the same conditions as in Comparative Example 1 to obtain a respective yield of pyridine 53%, beta-picoline 28%, and alpha-picoline 1% (total yield of 82%).

EXAMPLE 11

Effect by the Combination of Indium with Molybdenum

Same procedures were repeated except that the aqueous solution of tungstic ammonium employed in Example 10 was replaced with an aqueous solution of indium nitrate to obtain HZSM-5 (having indium content of 4.0% by weight and tungsten content of 1.0% by weight analyzed by an atomic absorption spectroscopy). Thus-prepared catalyst was tested according to the same conditions as in Example 1 to obtain a respective yield of pyridine 47%, beta-picoline 26%, and alpha-picoline 1% (total yield of 74%).

While the invention has been described in detail and with reference to specific embodiments thereof, it will be apparent to one skilled in the art that various changes and modifications can be made therein without departing from the spirit and scope thereof.

What is claimed is:

1. A process for the preparation of pyridine bases by the condensation of a reaction mixture consisting of aliphatic aldehydes and/or ketones with ammonia in the presence of catalysts under a gas phase, the improvement consisting of using a catalyst consisting of at least one metal compound or metal ions selected from the group consisting of indium, silver, germanium, and gallium in or on a zeolite by doping, by mixing, or by ion-exchanging.

2. A process for the preparation of pyridine bases as set forth in claim 1, wherein said zeolite has Si/Al atomic ratio of at least 10 and a Constraint Index range of 1–12.

3. A process for the preparation of pyridine bases as set forth in claim 1 or 2, wherein said zeolite has a Constraint Index range of 5–9.

4. A process for the preparation of pyridine bases as set forth in claim 1, wherein said zeolite is a crystalline silicate having atomic ratio of Si to Al, B, Fe, and/or Ga of at least 12 and a Constraint Index range of 1–12.

5. A process for the preparation of pyridine bases as set forth in claim 1, wherein a combination of starting materials is acrolein, acetaldehyde, and ammonia.

6. A process for the preparation of pyridine bases as set forth in claim 1, wherein there is employed said catalyst in which there is carried a indium compound or indium ion in by doping, mixing, or ion-exchanging.

7. A process for the preparation of pyridine bases by the condensation of aliphatic aldehydes and/or ketones with ammonia in the presence of catalysts under a gas phase, the improvement which comprises using a zeolite having a density of 0.5 to 1.0 g/ml after pelletized, as a catalyst.

8. A process for the preparation of pyridine bases as set forth in claim 7, wherein said zeolite has a Constraint Index range of 0.4–12.

9. A process for the preparation of pyridine bases as set forth in claim 7, wherein said zeolite has a density of 0.6 to 0.9 g/ml after pelletized and a Constraint Index range of 5.0–9.0.

10. A process for the preparation of pyridine bases by the condensation of aliphatic aldehydes and/or ketones with ammonia in the presence of catalysts under a gas phase, the improvement which comprises using a catalyst in which a mixture composed of indium and tungsten or indium and molybdenum is carried in or on a zeolite by doping, by mixing, or by ion-exchanging.

11. A process for the preparation of pyridine bases as set forth in claim 10, wherein said zeolite has an atomic ratio of Si to Al, B, Fe, and/or Ga of at least 12.

12. A process for the preparation of pyridine bases as set forth in claim 10, wherein said zeolite has an atomic ratio of Si to Al of at least 10.

13. A process for the preparation of pyridine bases as set forth in anyone of claims 10, 11, and 12, wherein said zeolite has a Constraint Index range of 1–12.

14. A process for the preparation of pyridine bases as set forth in claim 13, wherein said zeolite has a Constraint Index range of 5–9.

15. A process for the preparation of pyridine bases as set forth in claim 10, 11, or 12, wherein a combination of starting materials is acrolein, acetaldehyde, and ammonia.

16. A metal-contained zeolite having a Constraint Index range of 1–12 in which there is carried a mixture composed of indium and tungsten or indium and molybdenum.

17. A metal-contained zeolite as set forth in claim 16, wherein said zeolite has an atomic ratio of Si to Al, B, Fe, and/or Ga of at least 12.

18. A metal-contained zeolite as set forth in claim 16, wherein said zeolite has an atomic ratio of Si to Al of at least 10.

19. A metal-contained zeolite as set forth in claim 16, wherein said zeolite has a Constraint Index range of 5–9.

* * * * *